US011155720B2

United States Patent
Parviainen

(10) Patent No.: US 11,155,720 B2
(45) Date of Patent: Oct. 26, 2021

(54) WATER-BASED AEROSOL PAINT

(71) Applicant: Wisespray International Ltd, Helsinki (FI)

(72) Inventor: Ilkka Parviainen, Helsinki (FI)

(73) Assignee: Wisespray International Ltd, Helsinki (FI)

( * ) Notice: Subject to any disclaimer, the term of this patent is extended or adjusted under 35 U.S.C. 154(b) by 0 days.

(21) Appl. No.: 16/491,177

(22) PCT Filed: Mar. 6, 2018

(86) PCT No.: PCT/FI2018/050167
§ 371 (c)(1),
(2) Date: Sep. 5, 2019

(87) PCT Pub. No.: WO2018/162801
PCT Pub. Date: Sep. 13, 2018

(65) Prior Publication Data
US 2020/0032077 A1    Jan. 30, 2020

(30) Foreign Application Priority Data

Mar. 6, 2017   (FI) ..................................... 20170036
Mar. 6, 2018   (WO) .................. PCT/FI2018/050166

(51) Int. Cl.
| | |
|---|---|
| *C09K 3/30* | (2006.01) |
| *C09D 5/02* | (2006.01) |
| *B65D 83/14* | (2006.01) |
| *C08K 3/20* | (2006.01) |
| *C09D 167/08* | (2006.01) |
| *C09D 133/00* | (2006.01) |
| *C09D 175/06* | (2006.01) |
| *C08K 3/22* | (2006.01) |

(52) U.S. Cl.
CPC ............. *C09D 5/021* (2013.01); *B65D 83/14* (2013.01); *C08K 3/20* (2013.01); *C09D 5/022* (2013.01); *C09D 5/028* (2013.01); *C09D 133/00* (2013.01); *C09D 167/08* (2013.01); *C09D 175/06* (2013.01); *C09K 3/30* (2013.01); *C08K 2003/2241* (2013.01)

(58) Field of Classification Search
None
See application file for complete search history.

(56) References Cited

U.S. PATENT DOCUMENTS

| | | | |
|---|---|---|---|
| 4,420,575 A | 12/1983 | Rapaport et al. | |
| 5,158,609 A * | 10/1992 | O'Neill ................. | C09D 5/021 |
| | | | 106/236 |
| 5,988,455 A | 11/1999 | Pearson | |
| 6,135,165 A | 10/2000 | Zanellato et al. | |
| 6,303,552 B1 | 10/2001 | Vitomir | |
| 6,543,490 B1 | 4/2003 | Owens | |
| 7,935,183 B1 | 5/2011 | Coello et al. | |
| 9,914,848 B1 * | 3/2018 | Kordosh ................. | C09D 7/45 |
| 2005/0070638 A1 | 3/2005 | Coello et al. | |
| 2006/0260714 A1 | 11/2006 | Heatley et al. | |
| 2008/0021144 A1 | 1/2008 | Stahlberg et al. | |
| 2008/0161480 A1 | 7/2008 | Perumal | |
| 2012/0260824 A1 | 10/2012 | McCombs | |
| 2016/0002475 A1 | 1/2016 | Potthoff et al. | |
| 2017/0267868 A1 | 9/2017 | Halstead | |

FOREIGN PATENT DOCUMENTS

| | | | |
|---|---|---|---|
| CN | 103740205 A | | 4/2014 |
| CN | 106280930 A * | | 1/2017 |
| CN | 106280930 A | | 1/2017 |
| EP | 0387659 A1 | | 9/1990 |
| EP | 0439026 A2 | | 7/1991 |
| GB | 2259919 A | | 3/1993 |
| WO | 2017/098080 A1 | | 6/2017 |

* cited by examiner

Primary Examiner — Richard A Huhn
(74) Attorney, Agent, or Firm — Meunier Carlin & Curfman LLC

(57) ABSTRACT

The invention relates to a water based paint composition to be used in a pressurized and sealed aerosol can and which composition contains A) up to 24% w/w of propellant gas which is dimethyl ether (DME); B) up to 76% w/w of coating material, consisting nonvolatile content in the range of 65-95% w/w and volatile content in the range of 5-35% w/w; —which volatile content contains water up to 0-100% w/w and additives, co-solvents and dispersing agents which comprise altogether of 0-9% w/w of volatile liquids, having 0-10% w/w preferably less than 5% w/w of volatile organic compounds (VOC) provided that the aggregate amount of dimethyl ether (DME) and the volatile organic compounds (VOC) in volatile liquids is such that VOC concentration is below 186 g/l (responding about 24% w/w, calculated as DME). In the present invention the nonvolatile content comprises color pigments and possible fillers in the range of 0-30% w/w, polyurethane modified alkyd resin or alkyd resin in the range of 25-99% w/w preferably in the range of 35-90% w/w and additives up to 9% w/w, which resin is present as an emulsified dispersion in water miscible solvent comprising water and dimethyl ether (DME).

17 Claims, No Drawings

WATER-BASED AEROSOL PAINT

PRIORITY

This is a continuation application of U.S. patent application Ser. No. 16/491,177 filed on Sep. 5, 2019 which is a U.S. national application of PCT/FI2018/050167 filed on Mar. 6, 2018 and claiming priority of both the International Application PCT/FI2018/050166 Publication filed on Mar. 6, 2018 and the Finnish national application FI20170036 filed on Mar. 6, 2017, the contents of all of which are incorporated herein by reference.

FIELD OF THE INVENTION

The invention relates to a water-based paint composition defined in the claims to be used in a pressurized and sealed aerosol can.

BACKGROUND

The resins used in water-based aerosol paints are usually incompatible with some of the most common propellants, manly dimethyl ether (DME). Dimethyl ether itself is a polar, water compatible solvent but also a very strong diluent, which will attach many common binders in a water-based solvent system and render them sticky, large molecules when storing time is extended. Therefore, the shelf time and thus storage time of this kind of aerosol paints has been very limited if the concentration of binder is raised. To prevent this basic incompatibility of binder sin DME containing water-based solvents the binder concentration has been kept very low in aerosol paints. However, low concentration of binder composition restricts considerably the amount of pain components (pigments, additives etc.) and the film to be formed may be of poor quality and low gloss.

Very few volatile organic compounds free aerosol paints are available at present. This is due to presence of propellant in the aerosol paint which will add a significant amount of volatile organic compounds (VOC) into aerosol paint. Without propellant aerosol paint cannot be sprayed from an aerosol can. Other components used in aerosol paints (adjuvants, dispersion agents, binders, etc.) should be chosen so that they are selected from compounds which are VOC-free materials.

SUMMARY OF THE INVENTION

The above mentioned two problems as a starting point the objective of the present invention was two fold:

The first objective as to prepare a water-based aerosol paint having a high concentration of binder.

The second objective was to prepare a water-based aerosol paint with low VOC-values.

The above mentioned problems can be solved or at least alleviated by a water based paint composition as disclosed here. A method for preparing a water based aerosol paint with a high dry weight and a lowered amount of volatile organic compounds (VOC) is also disclosed.

More accurately the invention relates to a water based paint composition to be used in a pressurized and sealed aerosol can and which composition contains:

A) up to 24% w/w of propellant gas which is dimethyl ether (DME);

B) up to 76% w/w of coating material, consisting of nonvolatile content in the range of 65-95% w/w and volatile content in the range of 5-35% w/w;

which volatile content contains water up to 0-100% w/w and additives, co-solvents and dispersing agents which comprise altogether of 0-6% w/w of volatile liquids, having 0-10% w/w preferable 0-5% w/w of volatile organic compounds (VOC)

provided that the aggregate amount of dimethyl ether (DME) and the volatile organic compounds (VOC) in volatile liquids remains below about 24% w/w calculated as dimethyl ether (DME), and which nonvolatile content comprises color pigments and possible fillers in the range of 0-30% w/w, polyurethane modified alkyd resin or alkyd resin in the range of 45-99% w/w and additives up to 9% w/w, which resin is present as an emulsified dispersion in water miscible preferably up to 5% w/w solvent comprising water and dimethyl ether (DME).

DETAILED DESCRIPTION OF THE INVENTION

Volatile agent means herein an agent which will escape partially or totally from coalescing paint film. Volatile agent is usually also volatile organic compound.

Volatile organic compound (VOC) means herein an organic compound, which has the boiling point under 250° C. at a standard pressure of 101.3 kPa and have vapor pressure of 0.01 kPa or more at ordinary room temperature (20° C.).

Non-flammable aerosol is herein an aerosol which is non-flammable according to European directive 2008/47/EY, in regard to points 6.3.1 and 6.3.2.

Polyurethane modified alkyd resin or alkyd resin means herein an alkyd oil resin or a polyurethane alkyd oil resin, which have an oil content.

The present invention relates also to a method for preparing a water based aerosol paint with a high dry weight and a lowered amount of volatile organic compounds (VOC) by filling the aerosol aerosol can with the coating material comprising resin in the range of 20-80% preferable 30-70% w/w, additives and dispersing agents in the range of 0-2% w/w, color pigments, fillers in the range of 0-20% w/w the rest of the coating material being water and then filling the closed can with liquefied propellant dimethyl ether (DME). In the method resin is an alkyd resin or urethane modified alkyd resin selected from the following groups (a)-(f):

a) saponified/neutralized short oil alkyd which is water dilutable/emulsifiable having less than 40% of fatty acids, b) saponified/neutralized medium oil alkyd which is water dilutable/emulsifiable having 40-60% of fatty acids, c) emulsified/dispersed short oil alkyd having less than 40% of fatty acids, d) emulsified/dispersed medium oil alkyd having 40-60% of fatty acids, e) emulsified/dispersed polyurethane modified alkyd being chained with mid oil and having 40-60% of fatty acids and f) emulsified/dispersed polyurethane modified alkyd being chained with short oil and having less than 40% of fatty acids, the quality of liquid additives, dispersing agents, color pigments, fillers and mattening agents and their amount is additionally selected so, that their aggregate amount of volatile organic compounds will make less than 1%, the amount of DME to be added into can is up to 23% w/w of the total amount of the water based aerosol paint.

The present invention is a based on the idea that alkyd emulsions and polyurethane modified alkyd emulsions are made hardly without emulsifiers and/or surfactants. Mostly by leading steam in the liquid phase (alkyd liquid polymer+emulsifier or alkyd-pu liquid polymer+emulsifier) is already enough.

The hydrophobic part of the emulsifier feels perfectly at home in the "oily" that is fatty acid part of an oil modified alkyd resin or oil modified polyurethane alkyd molecule and the influence of the dimethyl ether (DME) on the hydrophilic part of the emulsifier can be neglected. This leads to a stable mixture in the aerosol can that can be sprayed easily without blocking valve systems of the aerosol can. the wet fil has the ability to flow and form a film without the need of co-solvents.

air dried. Typical solvent systems for these products are the aliphatic solvents. Some may be cut in aromatics or oxygenated solvents for high solids. Most will accept infinite dilution with aliphatic solvents. In the case of short oil alkyds, these resins are generally oven dried and have a limited solubility only with aromatic and other non-aliphatic solvents.

Besides short oil alkyd resins, there are two more types of alkyd resins: long oil alkyd resins and medium oil alkyd resins.

Long oil alkyd resin contains more than 60% fatty acids by weight.

Medium oil alkyd resin contains 40% to 60% fatty acids by weight.

Short oil alkyd resin contains less than 40% fatty acids by weight.

Structure:

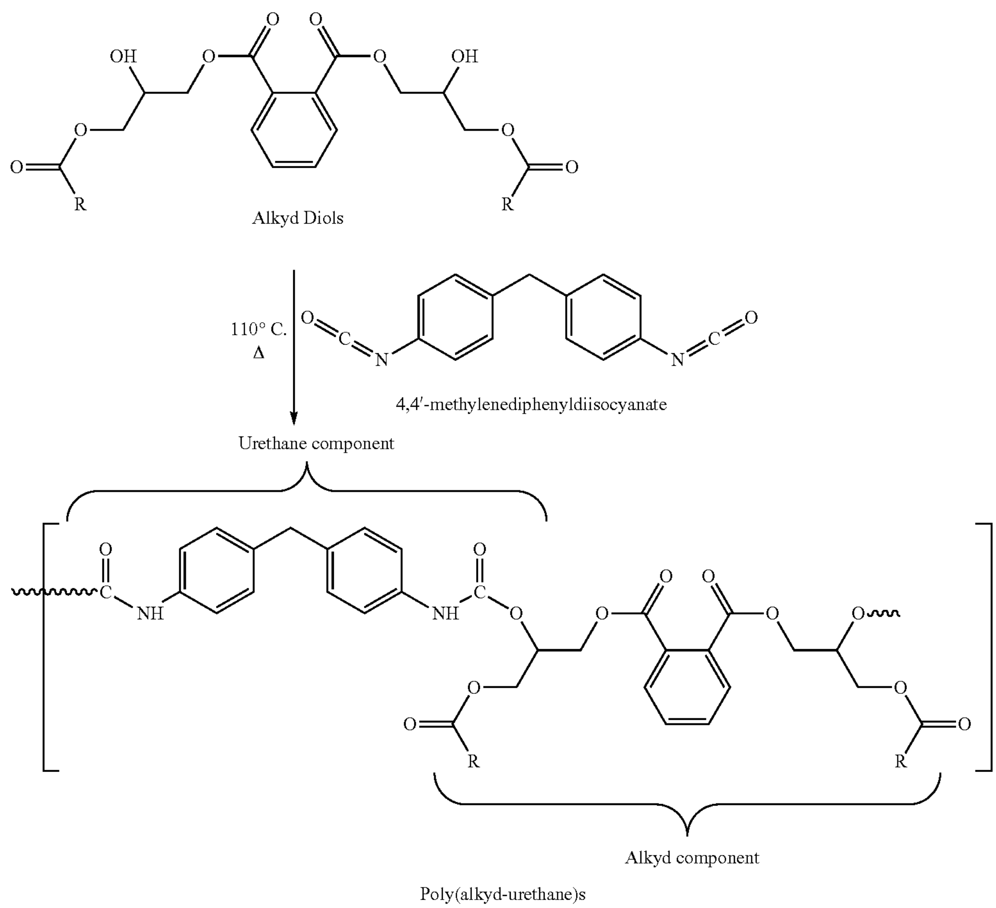

Preferable alkyd resin (or polyurethane modified) alkyd resin contains less than 40% w/w of fatty acids (short oil alkyd resin) or 40-60% w/w of fatty acids thus being medium long oil alkyd resin (or polyurethane modified alkyd resin).

A short oil alkyd resin is an alkyd binder made with a short oil to alkyd resin ratio. The percentage of fatty acids in the short oil alkyd resins is less than 40 percent. These fatty acids act as the modifying agents in the resins. The short oil alkyd resins are generally oven dried because they cannot be This structure of alkyd oil resin or alkyd polyurethane oil resin is flexible and will not be attacked by the presence of dimethyl ether (DME). In principle are all components compatible.

This kind of polymer does do not need any co-solvent to form a film for the emulsified particles flow by themselves when the liquid phase will evaporate.

Contrary to this due to the hard acrylic shell the particles of acrylics and acryl/alkyd-emulsions are not so sensitive to emulsifiers (difficult to penetrate for the hydrophobic part of the emulsifier). This is the reason why they are dispersed in water instead of emulsified with the help of surfactants.

If these dispersions are used in an aerosol where the propellant is dimethyl ether, which is a strong solvent when present in an aerosol can 25-40% w/w, dimethyl ether will attack the hard acrylic shell and will (partly) dissolve or plasticize the shell. This will lead to a disturbance in acrylic or acryl/alkyd-emulsions because sticky, half dissolved binder parts will form (much bigger than the initial dispersion) that will block the valve system of an aerosol can. Co-solvent will tackify/partly dissolve the acrylic shell and will form a film.

Preferable alkyd oil or alkyd urethane oil resin is preferable selected from resins of class a)-f), which can be used for promoting non-flammable water-based aerosol paints having high binder concentration:

a) saponified/neutralized short oil alkyd which is water dilutable/emulsifiable having less than 40% of fatty acids, b) saponified/neutralized medium oil alkyd which is water dilutable/emulsifiable having 40-60% of fatty acids, c) emulsified/dispersed short oil alkyd having less than 40% of fatty acids, d) emulsified/dispersed medium oil alkyd having 40-60% of fatty acids, e) emulsified/dispersed polyurethane modified alkyd being chained with mid oil having 40-60% of fatty acids f) emulsified/dispersed polyurethane modified alkyd being chained with short oil having less than 40% of fatty acids Exemplary Binders of Class a to f In the presents invention aerosol paint compositions are based preferable on alkyd oil resins or polyurethane alkyd resins. Broader class a)-f) can be used for promoting non-flammable water-based aerosol paints having high binder concentration. In table 1 are given exemplary binders in each of the above mentioned broader classes a) to f).

From binders one can choose VOC-free and low VOC alternate. VOC-values are given in supplier's product datasheets or safety datasheets. Below are exemplary binders with VOC-values given in supplier's safety and product datasheets.

TABLE 1

| exemplary binders to previously above mentioned broader classes a-f |
| --- |
| Necowel 4300 |
| Synaqua 4804 |
| Synthalat PWM 883 S |
| Worleesol E330W |
| Worleesol E927W |
| Necowel 586 N |
| DOMALKYD 0545 40 Wa |
| WorleeSol NW 410 (class b) |
| Crosscore 5000 |

Synaqua 4804

APEO an ammonia and solvent free short-oil alkyd emulsion (class a)

Necowel 4300 is a co-solvent free, cationic modified medium-oil alkyd neutralized with ammonia to make it water emulsifiable (class b).

Synthalat PWM 883 S

Solvent and surfactant free medium oil urethane alkyd emulsion (class e)

Necowel 586 N

Cosolvent free, modified alkyd emulsion medium oil length (class b)

Worleesol E330W

A solvent free short-oil modified polyurethane alkyd emulsion (class f)

Worleesol E927W

A solvent free short-oil modified polyurethane alkyd emulsion (class f)

DOMALKYD 0545 40 Wa (class d)

An anionic emulsion of polyurethane resin,

Properties of Above Mentioned Binders:

NECOWEL 586 N

Co-solvent free, modified alkyd emulsion medium oil length (class b)

NECOWEL 586 N is an aromatic PU-modified alkyd emulsion with medium oil length.

The emulsion does not contain APEO and is free of VOC and SVOC

Analytical data •

Solid content: 47-50% •

Oil length: approx. 50%•

Type of oil: soybean oil •

Viscosity: 2.0-3.5 Pas, 20° C. • pH-value: 7-8••

Solvent: water

DOMALKYD 0545 40 Wa (class d)

CHARACTERISTICS

Domalkyd 0545 40 Wa is anionic emulsion of polyurethane resin, modified with vegetable fatty acids. Supplied as 40% in water.

PHYSICAL CHARACTERISTICS:

| | |
| --- | --- |
| Non-volatile content DIN EN ISO 3251 | 40 ± 1% |
| Oil content | approx. 44% |
| Hydroxyl content (resin solid) DIN ISO 4629 | approx. 1% |
| Viscosity (100 1/s, 23° C.) DIN EN ISO 3219 | 50-500 mPas |
| pH DIN 19268 | 7-8 |
| Density approx. ISO 2811 | 1.02 g/cm$^3$ |

SPECIAL PROPERTIES: Rapid air drying, high gloss and excellent flow.

Outstanding adhesion and elasticity. High hardness, good water and chemical resistance.

APPLICATIONS: Domalkyd 0545 40 Wa is used for yellowing-resistant top coats and one-coat paints for industrial application (air and forced drying and stowing systems) on wood, steel and aluminium with excellent gloss retention and elasticity. Domalkyd 0545 40 Wa contains no emulsifiers and may be thinned with water at all ratios. Coating systems based on Domalkyd 0545 40 Wa exhibit very rapid physical drying. However, it is advisable to use some water based dryer. The siccative should be added carefully during agitation. Domalkyd 0545 40 Wa can be blended with water reducible melamine resin. Baking conditions depends on reactivity of melamine resin (max. 140° C.).

Synaqua 4804 (Class c)

Synaqua is a short oil alkyd emulsion. APEO and ammonia free, low VOC alternative available (below 50 g/l).

| | |
| --- | --- |
| Total solids | 50 ± 1% w/w |
| Viscosity | 300 Cps |
| Density | 9.9 |

-continued

| | |
|---|---|
| pH | 7.0 |
| Solvent: | water |

WorleeSol NW 410

This is a solvent free medium oil special modified alkyd emulsion (class d).

Appearance milky liquid delivery form 46% in water

| | |
|---|---|
| Non-volatile content | 46% ± 2 |
| Oil content (1 h/125° C.), | approx. 40%. |
| Defined: DIN EN ISO 3251 | |
| Viscosity, 20° C. | max. 3,000 mPas |
| defined: Brookfield, spindle 4/20 rpm, | |
| DIN EN ISO 2555 | |
| Density in 23° C. | 1.050 g/cm$^3$ |
| Defined: DIN EN ISO 2811-1. | |

WorleeSol NW 410 resin can be used for the manufacturing of water thinnable decorative and d.i.y. paints, which especially show a good brushability, excellent levelling and good filling properties. It is especially recommended for high gloss top coats. The formulation of wood protection stains is also possible.

Necowel 4300

Cationic modified medium-oil alkyd neutralized with ammonia co-solvent free, to make it water emulsifiable (class b).

| | |
|---|---|
| Solid content | 41-45% |
| Oil length | approx. 35% |
| Viscocity (25° C.) | 50-150 mPas |
| pH | 5.5-6.5 |
| Solvent: | water |

Crosscore 5000

A medium oil alkyd emulsion at 50% solids (class d).

Properties:

Medium to short oil alkyd emulsion Oil length 40%

Appearance milky white Solids 50%

Contains oil type soybean fatty acid co-solvent free and Amine free

Particle size+200 nm

Viscosity 20 mPas at 23° C. pH±7.

This resin is an example of resins of broader class d)

Additional properties: alkyd emulsion which is VOC free and don't need co-solvents to dry. There is no further VOC release after through drying and hardening.

Use: Interior and exterior primers and topcoats for wood, metal and joinery application, Corrosion resistant primers.

Worleesol E330W

Short oil modified PU alkyd emulsion, water thinnable (class f)

| | |
|---|---|
| Non-volatile content | 42 ± 2 |
| defined: DIN EN ISO 3251 | |
| Oil content about | 33% |
| Viscosity | max 10,000 mPas |
| defined DIN EN ISO 2555 | |
| Acid value, on solids | 15-20 |
| defined DIN EN ISO 2555 | |
| pH | 7.5-8.5 |
| Density 20 C. | 1.046 g/cm$^3$ |
| defined DIN EN ISI 2811-1 | |

Delivery: 42% in water, VOC free.

Worleesol E927W

Short oil PU alkyd emulsion (class f), for water-borne solvent systems

Good compatibility with acrylic dispersions

| | |
|---|---|
| Non-volatile content | 40% ± 2 |
| Defined: DIN EN ISO 3251 | |
| Oil content | approx. 27% |
| Density, 20° C., | approx. 1.04 g/cm$^3$ |
| Defined: DIN EN ISO 2811-1 | |
| Acid value, on solids, | max. 30 |
| Defined: DIN EN ISO 3682 | |
| pH-value | 6.8-7.5 |
| Defined: DIN ISO 976 | |
| Viscosity (20° C.), | max. 10.000 mPas |
| Defined: DIN EN ISO 2555 | |

Appearance milky liquid

Synthalat PWM 883 S

Solvent and surfactant free, urethane alkyd emulsion based on medium oil resin, with xylene below 0.1%

| | |
|---|---|
| Oil content | approx. 45% |
| Special drying fatty acid | |
| Supplied 45% in water | |
| viscosity in mPas | 200-700 (as supplied) |
| (in-house method AV-F-V005) | |
| non-volatile content | 45 ± 2% (as supplied) |
| (in-house method AV-F-F003) | |
| pH-value | 7.0-9.0 |
| (as supplied) (in-house method AV-F-P001) | |
| acid value | in mg KOH/g < 30 |
| (house method AV-F-S001) o | |
| Organic solvents | acetone < 0.3% |

Synthalat PWM 883/45% is suitable as sole binder for fast drying water based industrial lacquers with reduced amount of dryers.

Additives

In the present invention additives as selected to be either VOC-free or having low VOC-content. The VOC-values for any additive can be easily taken from supplier's product catalogues and safety datasheets. If there is any volatile organic compound in a specified additive, it must be mentioned in the safety datasheet for this additive.

Below have been given some non-restrictive guidelines for choosing VOC-free and low-VOC additives for aerosol paint compositions of the present invention.

Wetting and dispersing additives for waterborne application use electrosteric stabilization. The amount of added dispersing depends mainly on the pigment quality being usually on the very broad range of 6-90% calculated from the amount of the pigment.

Some exemplary VOC-free wetting and dispersing additives for water-borne paints: Byk 191, which is a solution of a copolymer with pigment-affinic groups in water. The additive deflocculates pigments by means of steric stabilization.

TEGO® Dispers 653, which is a pigment-wetting and dispersing additive. This additive has modified polyether with groups of high pigment affinity.

Defoaming agents. To prevent foam and destroy any foam present, defoamers have to be added to the formulation. Most defoamers are also effective to some degree as deaerators and the reverse is true. A defoamer must be insoluble in the formulation to be defoamed where it should be present in the form of finely divided droplets. Furthermore, it is necessary for it to be sufficiently compatible with the medium to be defoamed not to cause surface defects such as craters. Most used defoaming agents are polydimethylsiloxanes and modified polysiloxanes.

Some examples of VOC-free defoamers/deaerators:

Tego Airex 902W. Emulsion of a polyether siloxane copolymer, contains fumed silica.

Non-volatile content approx. 24%. Addition level calculated on total formulation: 0.2-3.0%.

Tego Foamex 840. Polyether siloxane copolymer, silica-free. Technical information —appearance clear liquid— active matter content 100%

Addition level calculated on total formulation: 0.05-0.5%. Addition may be either in the grind or during the let-down procedure.

Byk 1617. Emulsion of foam-destroying polysiloxanes, hydrophobic solids and emulsifying agents. Density (20° C.): 1.00 g/ml Non-volatile matter (60 min, 105° C.): 12.5%. Carrier: Water Viscosity modifiers. In water borne formulations, the binder is in the form of dispersed polymer particles so that regulation of the flow behavior by changing the molecular weight is not possible. Rheological additives (thickeners) must therefore be used to adjust the flow properties of waterborne coatings and printing inks.

Rheological additives can be roughly separated into inorganic and organic thickeners or thickeners for solvent borne or waterborne coatings.

Below are examples of modified inorganic thickeners for solvent borne and waterborne systems. This list is not intended to be comprehensive.

Water-borne and solvent-borne systems: Bentonite, synthetic lattice-layer silicate, pyrogenic silica (sometimes organically modified).

Examples of organic thickeners for waterborne and solvent borne systems include: polyureas, cellulose derivatives, polyamides. Examples of organic thickeners for waterborne coatings include: associative thickeners, non-associative thickeners.

Adhesion promoters (AP) are bi-functional materials that increase adhesive strength between the coating and the substrate and sometimes are referred to as coupling agents.

Titanates and zirconates are coupling agents and adhesion promoters that increase impact strength and chemical resistance and enhance physical, compounding and application properties.

Monomeric phosphate chemistries and phosphate-esters are materials used in free-radical emulsion polymerization and provide wet adhesion bonding to the substrate.

Oligomeric Silanes. The first-generation coupling agents that are still used to improve adhesion are mono-functional. These mono-functional silane adhesion promoters are more and more substituted by oligomers. The oligomer molecules have a moderately high molecular weight and multiple functionality in both types of reactive groups: Methoxy (—O—CH3) groups, directly linked to silicon (Si) atoms, which form a covalent bond with the hydroxyl (—OH) groups of the metal substrate. Epoxy groups that co-crosslink with the binder system during film formation. The core of the additive is formed by a strong siloxane network that has excellent resistance against, for example, hydrolysis, chemicals and UV radiation. Despite the increased molecular weight, compared to mono-functional silanes, the oligomer has a low viscosity and a broad compatibility.

Examples from Compositions

Paint Compositions for Aerosol Cans

Following compositions were prepared into an aerosol can by filling an aerosol can with the coating material then closing the can. The closed can was filled with liquefied propellant dimethyl ether (DME). The filling volume of the can was either 400 ml or 675 ml. In any of the given examples can be used all binders given in table 1.

Example 1

High Gloss Top Coat

| Ingredients | % w/w |
| --- | --- |
| Necowell 4300 | 60.00 |
| Dispersing aid | 0.40 |
| Drier | 0.06 |
| Defoamer | 0.30 |
| color pastes | 10.00 |
| Thickener | 0.25 |
| Aerosil 200 (SiO2 fumed) | 0.50 |
| Water | 6.49 |
| Dimethyl ether | 22.00 |
| Total | 100.00 |

Instead of Necowell 4300 also other binders mentioned in table 1 can be used.

Example 2

Anti Rust Primer

| Ingredient | % w/w |
| --- | --- |
| Synaqua 4804 | 53.40 |
| Dispersing aid | 0.60 |
| Defoamer | 0.30 |
| Iron Oxyde RED paste | 8.00 |
| Calcium modified silica gel | 5.00 |
| Bentonite | 0.60 |
| thickener | 0.16 |
| Water | 3.50 |
| dimethyl ether | 27.00 |
| Total | 100.00 |

Instead of Synaqua 4804 also other binders mentioned in table 1 can be used.

Example 3

Clear Top Coat

| Ingredient | % w/w |
| --- | --- |
| Worleesol E330W | 57.00 |
| Defoamer | 0.30 |
| Thickener | 0.35 |
| Flow/slip additive | 0.10 |
| Flow/slip additive | 20.25 |
| Dimethyl ether | 22.00 |
| Total | 100.00 |

Instead of binder Worleesol E330W can also be used WorleeSol NW 410. Also other binders mentioned in table 1 can be used.

Example 4

Fast drying color high gloss top coat with excellent anti corrosion proportions

| Ingredient | % w/w |
| --- | --- |
| Worleesol E927W | 25.00 |
| Domalkyd 0545 40 Wa or Necowel 586 N | 30.00 |
| dispersing agent | 0.25 |
| defoamer | 0.20 |
| flow/slip additive | 0.18 |
| thickner (newtonian) | 0.10 |
| thickner (tixothrope) | 0.16 |
| mix of collar paste's | 10.00 |
| Water | 11.11 |
| Dimethyl ether | 23.00 |
| Total | 100.00 |

Instead of Worleesol E927W and Domalkyd 0545 40 Wa or Necowel 586 N also other binders mentioned in table 1 can be used.

Example 5

A typical water-based aerosol base paint of the invention comprises polyurethane-modified resin 80-100 g (binder), water 100-150 g, various additives 2-11 g and dimethyl ether (DME) 75-95 g, packed for example in an aerosol bottle having a filling volume of 400 ml.

One typical ready-to-use aerosol base paint of the invention, present in a pressurized aerosol bottle with a filling volume of 400 ml, was prepared as follows:
- the polyurethane-modified resin and additives were dispensed into an aerosol bottle;
- the propellant (DME) was added into the aerosol bottle and the bottle was sealed to become airtight.

Thus, the pressurized aerosol bottle having a filling volume of 400 ml contained the following aerosol base paint components in liquid phase:

| Ingredient | amount/g | amount/w-% |
| --- | --- | --- |
| Polyurethane-modified alkyd resin | 92.7 | 30.1 |
| Flow promoter (Capston) | 0.8 | 0.2 |
| Pigment stabilizer (Dextrol) | 0.9 | 0.3 |
| Thickener (Rheolate) | 1.8 | 0.6 |
| Drying agent (Additol) | 3.3 | 1.1 |
| Drying accelerator | 2.3 | 0.7 |
| Monoethanolamine (corrosion inhibitor) | 0.8 | 0.2 |
| Water | 121.5 | 39.5 |
| DME (dimethyl ether) | 83.6 | 27.2 |
| Total | 307.0 | 100.0 |

The density of this aerosol base paint was about 1 g/cm$^3$, whereby the volume occupied by the liquid phase of the aerosol bottle's filling volume (400 ml) was about 300 ml.

Polyurethane resin contains water so as to have a dry matter content of 10-60%. Above is given the proportion of dry polyurethane resin.

Such an aerosol base paint is combustible as such, but have a high binder content (about 30% by weight) and low amount of DME (27% by weight) and can be used for preparing any of the non-flammable paint compositions aerosol in an aerosol can.

This aerosol base paint is compatible with most of the commercial toning equipment for water-based paints, i.e. it can have a pigment (coloring paste) dispensed therein in a mechanized manner with dispensing devices having a dosing accuracy of 0.1-0.2 ml.

This aerosol base paint makes it possible to provide a paint coating with any desired gloss level (matte, semi-gloss, glossy)

One and the same aerosol base paint lends itself to being toned for a precisely desired tint for example with the RAL color matching system (168 color tones) or with the NCS color tone system (1668 color tones).

Instead of polyurethane-modified alkyd, it is also possible to use alkyd, epoxy-modified alkyd, styrene-butadiene emulsions/dispersions.

Example 6

A base paint for preparing a non-flammable paint into an aerosol can;

First aerosol base paint modified in terms of the amount of alkyd resin

| Ingredient | amount/g | amount/w-% |
| --- | --- | --- |
| Polyurethane-modified alkyd resin | 67.7 | 22.0 |
| Flow promoter (Capston) | 0.8 | 0.2 |
| Color pigment stabilizer (Dextrol) | 0.9 | 0.3 |
| Thickener (Rheolate) | 1.8 | 0.6 |
| Drying agent (Additol) | 3.3 | 1.1 |
| Drying accelerator | 2.3 | 0.7 |
| Monoethanolamine (corrosion inhibitor) | 0.8 | 0.2 |
| Water | 146.5 | 47.6 |
| DME | 83.6 | 27.2 |
| Total | 307.0 | 100.0 |

In the aerosol base paint of example 1, having been packed into an aerosol bottle with a filling volume of 400 ml, the amount of alkyd resin was modified according to which components were added from a filling cup of 100 ml into the aerosol base paint present in the aerosol bottle. The filling cup was again functionally in communication with a toning and dispensing device whose minimum dosing amount was 0.1 ml of coloring paste.

The first aerosol base paint, which was modified in terms of the amount of alkyd resin, had been modified in such a way that it could be supplemented from the filling cup of a toning and dispensing device with a coloring paste in the amount of 1-35 ml corresponding to each color tone recipe, as well as with a binder and water 50 ml in total (50% by volume of water, 50% by volume of polyurethane-modified alkyd resin). Thereby is obtained an aerosol paint toned to readiness, the space occupied thereby being 350-400 ml of the aerosol bottle with a filling volume of 400 ml.

Example 7

Second aerosol base paint modified in terms of the amount of alkyd resin:

| Ingredient | amount/g | amount/w-% |
| --- | --- | --- |
| Polyurethane-modified alkyd resin | 42.7 | 13.9 |
| Flow promoter (Capston) | 0.8 | 0.2 |
| Color pigment stabilizer (Dextrol) | 0.9 | 0.3 |
| Thickener (Rheolate) | 1.8 | 0.6 |
| Drying agent (Additol) | 3.3 | 1.1 |
| Drying accelerator | 2.3 | 0.7 |
| Monoethanolamine (corrosion inhibitor) | 0.8 | 0.2 |

| Ingredient | amount/g | amount/w-% |
|---|---|---|
| Water | 171.5 | 55.8 |
| DME | 83.6 | 27.2 |
| Total | 307.0 | 100.0 |

In the second modified aerosol base paint, the amount of alkyd resin in the aerosol base paint of example 1 had been changed in such a way that it could be supplemented from a filling cup of the toning and dispensing device with a coloring paste in the amount of 1-35 ml corresponding to each color tone recipe, and with 50 ml of water. Thereby is obtained an aerosol paint toned to readiness, the space occupied thereby being 350-400 ml of the aerosol bottle with a filling volume of 400 ml.

Examples 8A and 8B

Example 8A

The aerosol base paint of example 5 was modified to get a white base paint and it was packed into an aerosol can with a filling volume of 400 ml and then toned in a mechanized manner with a commercial dispensing machine whose minimum dispensing amount was 0.1 ml of color paste compound.

The color paste mixture was dispensed into a filling cup of the dispensing machine in an amount 1-50 ml corresponding to color tone recipe, and then into the same filling cup was added 40 ml of binder (polyurethane-modified alkyd resin). Thereby was obtained an aerosol paint toned to readiness for use, the space occupied thereby being 350-400 ml of the aerosol can with a filling volume of 400 ml.

Part A: Filled Aerosol can

| | |
|---|---|
| White base paint | 247 g (185 ml) |
| DME (dimethyl ether) | 73 g (110 ml) |

Part B: Filling Cup. Added to Aerosol can of Part a

| | |
|---|---|
| Domalkyd 0545 40 Wa or Necowel 586 N (binder) (40% w/w emulsion in water) | 40 g |
| Color paste mixture | 20-50 g (20-50 ml) |

Parts A+B Combined, Main Components of the Formed Aerosol Paint

| | |
|---|---|
| Binder (Domalkyd 0545 40 Wa or Necowel 586 N) | 31% w/w |
| Water | 10% w/w |
| DME | 19% w/w |
| TiO$_2$ | 25% w/w |
| Other pigments | 5-12% w/w |
| Additives | 5-12% w/w, |
| wherein each of the additive is added | 0.1-1.5% w/w |

White base paint composition and its volatile organic compounds
 Polyurethane modified alkyd emulsion
  Domalkyd 0545 40 Wa or Necowel 586 N 40% w/w in water, VOC Free
 Siccatief 0.22% w/w
 Drier
 Dextrol OC-180
  dispersing agent)
 TiO$_2$
 Capstone SF 65
  surface tension modifier, VOC free
 BYk 349
  surface tension modifier
 Rheolate 310
  rheology modifier, VOC free
 Diosperbyk 199
  Wetting and dispersive agent, Voc free, pigment stabilizer
 AMP
  pH modifier
 Water (demineralized)
 Acemat Ok 520
  solid matting agent As can be seen above none of the additives, binder or pigments contains any volatile organic compounds (VOC). The only VOC-source was DME having weight of 19% w/w of the total weight of the readymade aerosol paint in the can (400 ml). The VOC-content of this aerosol paint is 19% and it was non-flammable in a subsequent test.

Example 8B

The aerosol base paint of example 1 was modified to get a clear base paint and it was packed into an aerosol can with a filling volume of 400 ml and then toned in a mechanized manner with a commercial dispensing machine whose minimum dispensing amount was 0.1 ml of color paste compound.

The color paste mixture was dispensed into a filling cup of the dispensing machine in an amount 1-50 ml corresponding to color tone recipe, and then into the same filling cup was added 40 ml of binder (polyurethane-modified alkyd resin). Thereby was obtained an aerosol paint toned to readiness for use, the space occupied thereby being 350-400 ml of the aerosol can with a filling volume of 400 ml.

Part A: Filled Aerosol can

| | |
|---|---|
| Binder mix clear | 185 g (185 ml) |
| DME (dimethyl ether) | 73 g (110 ml) |

Part B: Filling Cup. Added to Aerosol can of Part a

| | |
|---|---|
| Domalkyd 0545 40 Wa or Necowel 586 N (binder) (40% w/w emulsion in water) | 40 g |
| Color paste mixture | 20-50 g (20-50 ml) |

Parts A+B Combined, Main Components of the Formed Aerosol Paint

| | |
|---|---|
| Binder (Domalkyd 0545 40 Wa or Necowel 586 N) | 48% w/w |
| Water | 6% w/w |
| DME | 21% w/w |
| Pigments | 7-15% w/w |
| Additives | 5-10% w/w, |
| wherein each of the additive is added | 0.1-1.5% w/w |

Clear binder mix base paint composition and its volatile organic compounds
 Polyurethane modified alkyd emulsion
  Domalkyd 0545 40 Wa or Necowel 586 N 40% w/w in water, VOC Free
 Borchi oxy coat, Voc free
 Drier Dextrol OC-180
dispersing agent)
TiO$_2$
Capstone SF 65
surface tension modifier, VOC free
BYk 349
surface tension modifier
Rheolate 310
rheology modifier, VOC free
Diosperbyk 199
Wetting and dispersive agent, Voc free, pigment stabilizer
AMP
pH modifier
Water (demineralized)

As can be seen above none of the additives, binder or pigments contains any volatile organic compounds (VOC). The only VOC-source was DME having weight of 19% w/w of the total weight of the readymade aerosol paint in the can (400 ml). The VOC-content of this aerosol paint is 21% w/w and the paint was non-flammable in a subsequent test.

Example 8

Comparison Tests for Ageing of Aerosol Paints
General

The spray pattern delivered from an aerosol can is a combination of the content of the can proportions, being the amount of liquefied propellant, the pressure, viscosity and of course how fine are the solid particles that have to be transported through the valve and the actuator.

As an indication the diameter of the openings in the valve and actuator during the spraying are between 0.1 mm to 0.5 mm.

This means if paint in the can starts to flocculate or is the binder gets attacked by the propellant (DME) and cloaks together this will have a direct impact on the spray result.

This can lead to solid particles disturbing the wet film and being visible in the dry film until totally blocking of the valve and actuator.

Aging tests have been done with the formulations 1-3.
Formulation 1
Colored top coat based on mix of polyurethane modified short and medium oil alkyd emulsion (composition according to invention)

| Ingredient | amount/w-% |
|---|---|
| Resin 1 Worleesol E927W | 25.00 |
| Resin 2 Domalkyd 0545 40 Wa or Necowel 586 N | 30.00 |
| dispersing agent Byk 191 | 0.25 |
| defoamer Byk 015 | 0.20 |
| flow/slip additive tego glide 110 | 0.18 |
| thickener (Tixothrope)Tafigel pur 60 | 0.10 |
| thickener (Tixothrope) Byk 525 | 0.16 |
| color paste mixture | 10.00 |
| water | 11.11 |
| Dimethyl ether | 12.00 |
| Total | 100.00 |

Formulation 3I: Acrylic dispersion based colored top coat

| Ingredient | % w/w |
|---|---|
| EPS 294 (405 w/w in water) | 35.00 |
| thickener Rheolate 310 | 0.40 |
| Tego glide 110 | 0.30 |

-continued

| Ingredient | % w/w |
|---|---|
| Bentone SD2 | 0.13 |
| Color pastes | 8.00 |
| Texanol (solvent no VOC) 3-pentanediol,2,2,4-trimethyl-monoisobutyrate) | 4.00 |
| water | 17.17 |
| Dimethyl ether (DME) | 35.00 |
| Total | 100.00 |

Formulation 3I
Clear acrylic varnish:

| Ingredient | % w/w |
|---|---|
| Joncryl 538 (acrylic dispersion) | 32.40 |
| Joncryl 683 (low mol weight acryl 98% in solvent) | 9.00 |
| diethyleneglycol monobutylether (non-flammable but it will burn. UEL 6.2 LEL 0.9% in air) | 4.00 |
| Isopropanol | 3.00 |
| Defoamer byk 015 | 0.30 |
| Acemat 520 (hydrophobic fumed silica) | 0.40 |
| Thickener DSX 3290 | 0.55 |
| water | 10.35 |
| Dimethyl ether | 40.00 |
| Total | 100.00 |

Results

After aging tests in the oven at 40° C. and 20° C. with intervals of 1 week spray test have been performed.
Formulation I
1 week high gloss good opacity no spray defects Eventually this formulation has a shelf life of app 3 years at 20° C.
Formulation 2
1 week little lower gloss than fresh can at start of the test. opacity ok
2 weeks solid particles in the spray interrupting the spray pattern and visible in the wet and dry film.
3 weeks after vigorously shaking the shaking balls were free a pray attempt was made but the valve/actuator system was blocked completely. After degassing the can (uncultured with a pin) the paint in the can was observed. It showed total coagulated binder and color pigment.
Conclusion: not stable, short shelf life
Formulation 3
Immediately (timeframe appr. 1h) after making the can it was impossible to spray for the moment the actuator was pushed down the valve and the actuator blocked completely.
After degassing the can (uncultured with a pin) the paint in the can was observed. It showed total coagulated binder and color pigment.
Conclusion: Nor stable, very short shelf life
Conclusions: Acrylic dispersions (formula I and 2) of water-borne aerosol paint do not have enough shelf life, because acrylic resins are incompatible with propellant dimethyl ether (DME). When alkyd polyurethane modified short and medium oil alkyd emulsion were used as resin enough shelf life was achieved.

The invention claimed is:
1. A water based aerosol paint composition used in a pressurized and sealed aerosol can, comprising:
   A) up to 24% w/w of propellant gas, which is dimethyl ether (DME);

B) up to 76% w/w of a coating material consisting of a nonvolatile content in a range of 65-95% w/w and a volatile content in a range of 5-35% w/w, which volatile content, comprising 0-9% w/w of volatile liquids made up by additives, co-solvents, dispersing agents and water up to 0-100% w/w, the volatile liquids having 0-10% w/w of volatile organic compounds (VOC), provided that an aggregate amount of the dimethyl ether (DME) and the volatile organic compounds (VOC) in the volatile liquids, is such, that a volatile organic compounds (VOC) concentration is below 186 g/l (corresponding to about 24% w/w, calculated as DME) and which nonvolatile content comprises color pigments and fillers in a range of 0-30% w/w, an acryl resin, an acryl/alkyd-resin, a polyurethane modified alkyd resin or an alkyd resin in a range of 25-99% w/w, and additives up to 9% w/w, wherein the acryl resin, the acryl/alkyd-resin, the polyurethane modified alkyd resin or the alkyd resin is present as an emulsified dispersion in a water miscible solvent comprising water and the dimethyl ether (DME).

2. The water based aerosol paint composition of claim 1, wherein the volatile liquids have less than 5% w/w of the volatile organic compounds (VOC).

3. The water based aerosol paint composition of claim 1, wherein the acryl resin, the acryl/alkyd-resin, the polyurethane modified alkyd resin or the alkyd resin is in a range of 35-90% w/w.

4. The water based aerosol paint composition of claim 1, wherein the composition consists of the dimethyl ether (DME) in a weight of up to 24% w/w, the polyurethane modified alkyd resin or the alkyd resin in a range of 30-65% w/w, the additives and the dispersing agents in a range of 0-2% w/w, the color pigments, the fillers and mattening agents in a range of 0-20% w/w and the rest being water.

5. The water based aerosol paint of claim 4, wherein the color pigments contain $TiO_2$.

6. The water based aerosol paint composition of claim 1, wherein the composition consists of the dimethyl ether (DME) up to 24% w/w, the polyurethane modified alkyd resin or the alkyd resin in a range of 30-65% w/w, the additives and the dispersing agents in a range of 0-2% w/w and the rest being water.

7. The water based aerosol paint composition of claim 1, wherein the dry weight is in a range of 40-45% of the nonvolatile content and 30-37% w/w from a total weight of the aerosol paint, which nonvolatile content of the aerosol paint consists of the dry weight of (i) the cumulatively added weight amounts of the polyurethane modified alkyd resin or the alkyd resin, the additives and the dispersing agents, the color pigments, the fillers and mattening agents and (ii) the rest being water.

8. The water based aerosol paint composition of claim 7, wherein the dry weight is in a range of 40-45% of the nonvolatile content and 32-35% w/w from a total weight of the aerosol paint, which nonvolatile content of the aerosol paint consists of the dry weight of (i) the cumulatively added weight amounts of the polyurethane modified alkyd resin or the alkyd resin, the additives and the dispersing agents, the color pigments, the fillers and mattening agents and (ii) the rest being water.

9. The water based aerosol paint composition of claim 1, wherein the polyurethane modified alkyd resin or the alkyd resin is at least one resin selected from a)-f) defined as:

a) saponified/neutralized short oil alkyd, which is water dilutable/emulsifiable having less than 40% of fatty acids,
b) saponified/neutralized medium oil alkyd, which is water dilutable/emulsifiable having 40-60% of fatty acids,
c) emulsified/dispersed short oil alkyd having less than 40% of fatty acids,
d) emulsified/dispersed medium oil alkyd having 40-60% of fatty acids,
e) emulsified/dispersed polyurethane modified alkyd with mid oil having 40-60% of fatty acids,
f) emulsified/dispersed polyurethane modified alkyd with short oil having less than 40% of fatty acids.

10. The water based aerosol paint composition of claim 1, wherein the water miscible solvent consists of water and dimethyl ether.

11. The water based aerosol paint composition of claim 1, wherein the water miscible solvent does not contain any organic co-solvent.

12. The water based aerosol paint composition of claim 1, wherein the acryl resin, the acryl/alkyd-resin, the polyurethane modified alkyd resin or the alkyd resin is an acrylic dispersion, an acrylic emulsion or an acryl/alkyd dispersion.

13. The water based aerosol paint composition of claim 1, wherein the resin selected from the acryl resin, the acryl/alkyd-resin, the polyurethane modified alkyd resin or the alkyd resin does not contain any organic co-solvent.

14. A method for preparing a water based aerosol paint comprising a lowered amount of volatile organic compounds (VOC) in a pressurized and sealed aerosol can, the method comprising:

filling the aerosol can with the coating material defined in claim 1, and filling the can with liquefied propellant dimethyl ether (DME).

15. The method of claim 14, wherein a filling volume of the can is either 400 ml or 675 ml.

16. A method for preparing a water based aerosol paint comprising a lowered amount of volatile organic compounds (VOC), the method comprising:

filling an aerosol can with a coating material comprising a resin in a range of 50-65% w/w, additives and dispersing agents in a range of 0-2% w/w, color pigments, fillers in a range of 0-20% w/w, the rest of the coating material being water; and filling the can with liquefied propellant dimethyl ether (DME), wherein the resin is an alkyd resin or a urethane modified alkyd resin selected from (a)-(f) defined as:

a) saponified/neutralized short oil alkyd, which is water dilutable/emulsifiable having less than 40% of fatty acids,
b) saponified/neutralized medium oil alkyd, which is water dilutable/emulsifiable having 40-60% of fatty acids,
c) emulsified/dispersed short oil alkyd having less than 40% of fatty acids,
d) emulsified/dispersed medium oil alkyd having 40-60% of fatty acids,
e) emulsified/dispersed polyurethane modified alkyd with mid oil and having 40-60% of fatty acids and
f) emulsified/dispersed polyurethane modified alkyd with short oil and having less than 40% of fatty acids, wherein the
the quantity of the additives, the dispersing agents, the color pigments, the fillers and mattening agents is selected, so that their aggregate amount of the volatile organic compounds (VOC) is less than 3% of the total amount of the volatile organic compounds (VOC) and non-volatile organic compounds, and the amount of the dimethyl ether (DME) added into the can is less than 24% w/w of the total amount of the water based aerosol paint.

17. The method defined in claim 16, wherein the resin is selected so that shelf life of the water based aerosol paint is 36 months.

* * * * *